(No Model.)
3 Sheets—Sheet 1.
C. E. BUZBY.
TESTING MACHINE.
No. 406,084.　　　　　　　　　Patented July 2, 1889.
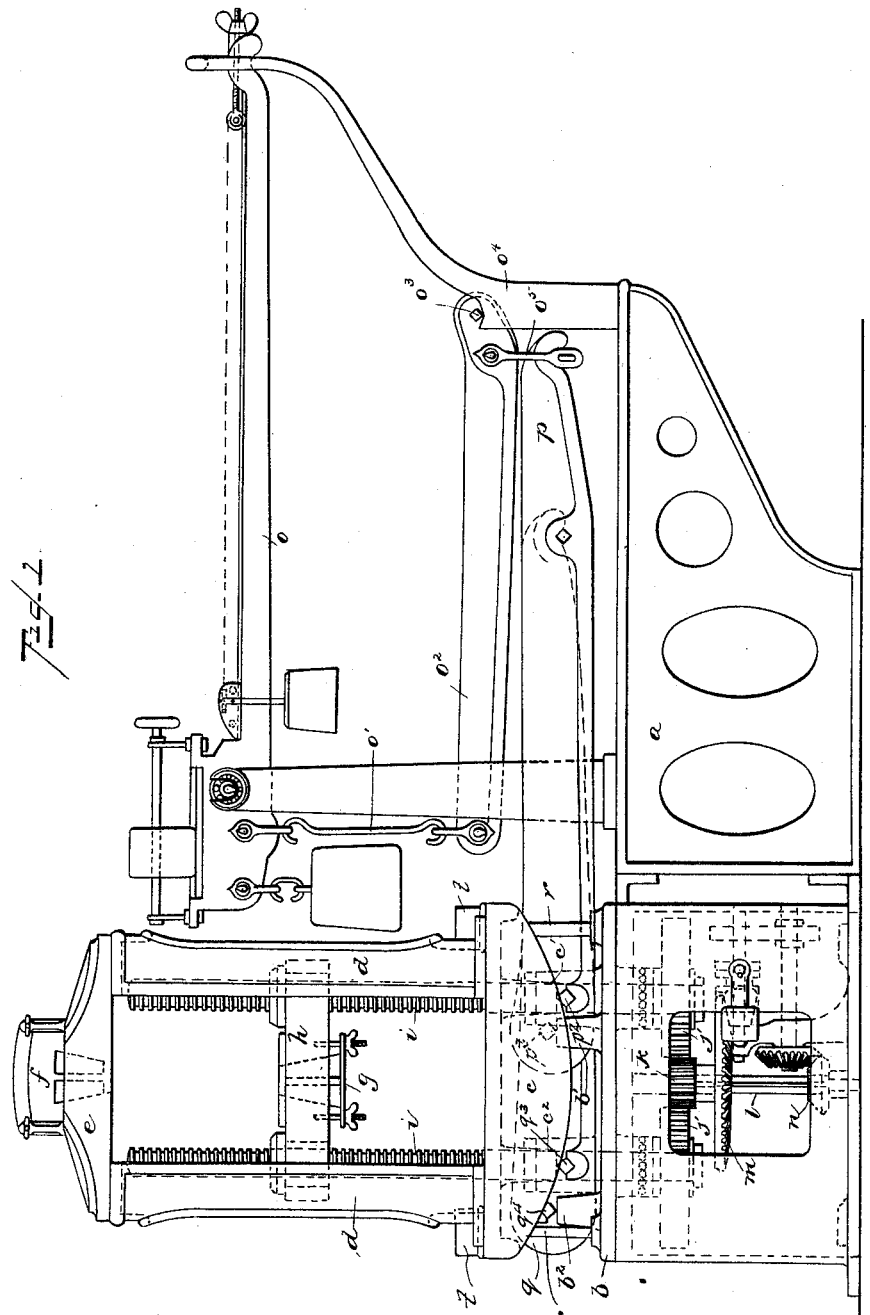
WITNESSES　　　　　　　　　INVENTOR

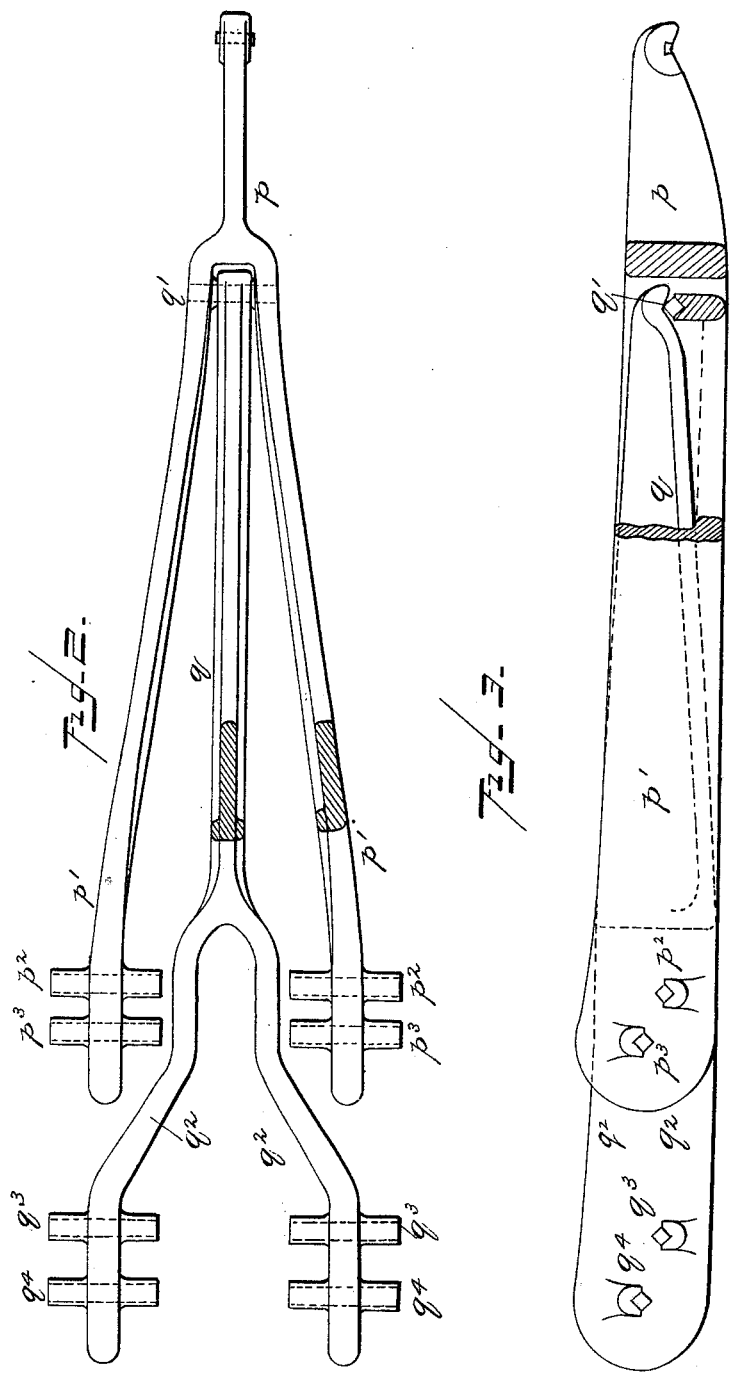

(No Model.) 3 Sheets—Sheet 3.
C. E. BUZBY.
TESTING MACHINE.
No. 406,084. Patented July 2, 1889.
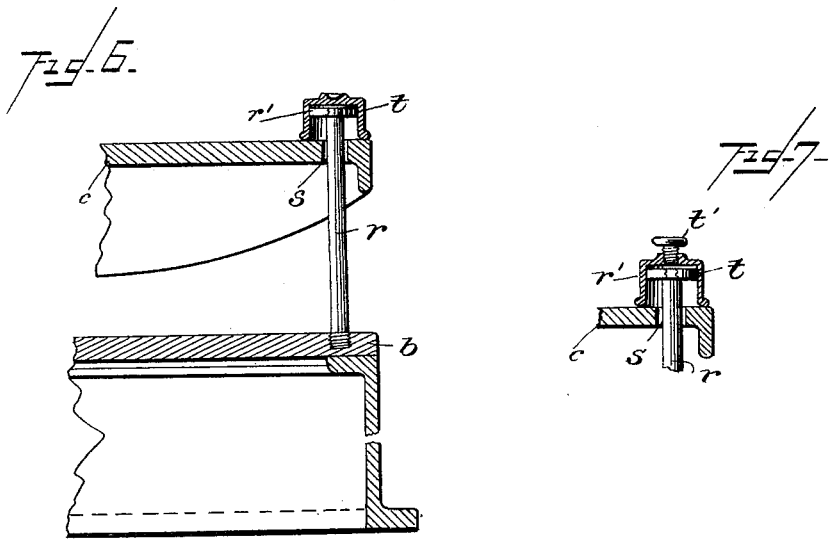
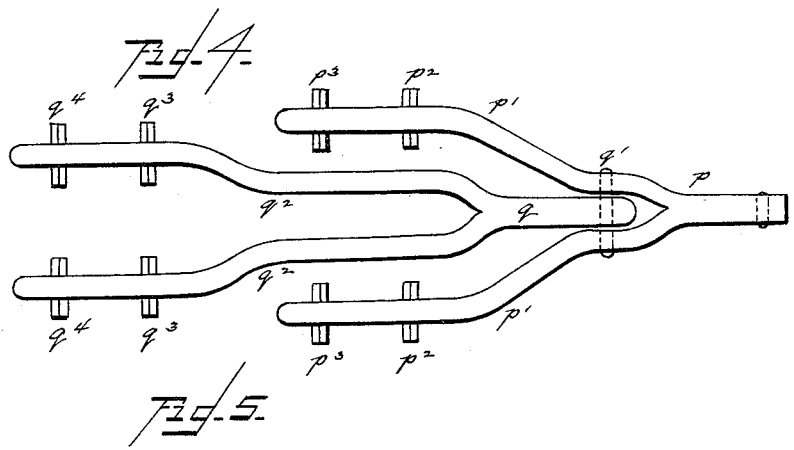
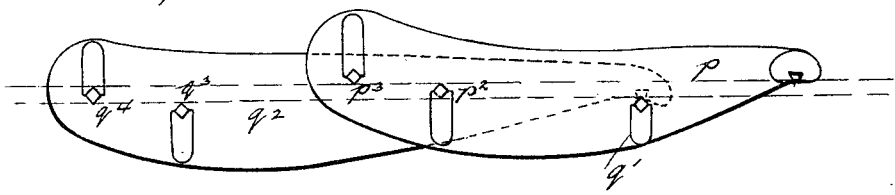
WITNESSES
F. L. Durand
E. A. Finckel
INVENTOR
Charles Ernest Buzby
by Wm. H. Finckel
Attorney

UNITED STATES PATENT OFFICE.

CHARLES ERNEST BUZBY, OF PHILADELPHIA, PENNSYLVANIA, ASSIGNOR TO HENRY B. RIEHLÉ AND FREDERICK A. RIEHLÉ, OF SAME PLACE.

TESTING-MACHINE.

SPECIFICATION forming part of Letters Patent No. 406,084, dated July 2, 1889.

Application filed March 12, 1889. Serial No. 302,969. (No model.)

*To all whom it may concern:*

Be it known that I, CHARLES ERNEST BUZBY, a citizen of the United States, residing at Philadelphia, in the county of Philadelphia and State of Pennsylvania, have invented a certain new and useful Improvement in Testing-Machines, of which the following is a full, clear, and exact description.

This invention relates to machines for testing the tensile strength and other physical properties of metals and other materials, and has special reference to levers for supporting the movable table and transmitting the strain thereon to the weighing or measuring apparatus, and to means for preventing the recoil of such table at the instant of rupture of the specimen.

In the accompanying drawings illustrating my invention, in the several figures of which like parts are similarly designated, Figure 1 is a side elevation of a testing-machine embodying my invention, but omitting the details of the driving mechanism. Fig. 2 is a plan view, and Fig. 3 a sectional elevation in detail, of one form of levers; and Fig. 4 is a plan, and Fig. 5 a side elevation, of another form of levers. Fig. 6 is a vertical section of one of the air-checks as applied to the table and bed of the machine, and Fig. 7 is a vertical section of a modified form of air-checks.

The frame $a$ may be of suitable construction to receive the parts of the machine, and includes the bed $b$. Over this bed is arranged the table $c$. This table supports two columns $d$, which sustain an entablature $e$. The entablature $e$ receives one of the grips $f$, and the other grip $g$ is supported in the movable cross-head $h$, which is arranged upon the two screws $i$ and $i$. The screws $i$ are provided with pinions $j$, which are engaged by a pinion $k$ on an upright shaft $l$, and this upright shaft has beveled gears $m$ and $n$ of different sizes for speeding at different rates in any well-known way. $o$ is a scale-beam, which is shown as provided with a poise, forming the subject of my patent, No. 368,514. The beam is connected by a link $o'$ with a lever $o^2$, having its fulcrum at $o^3$ on the bracket $o^4$ of the frame $a$, and this lever $o^2$ is connected by a link $o^5$ with the lever $p$, forming part of this invention. The lever $p$ has the divergent arms $p'$, terminating in parallel portions having the knife-edges $p^2$ $p^3$, respectively co-operating with lugs $c'$, depending from opposite sides of the table, and lugs $b'$, rising from the bed. The second lever $q$ has a knife-edge bearing at $q'$ within the lever $p$ and at the initial point of divergence of the arms, and said levers $p$ and $q$ are of the same or substantially the same length. The lever $q$ also has divergent arms, (lettered $q^2$ $q^2$,) which are parallel at their rear ends, and are provided with knife-edges $q^3$ and $q^4$, which respectively engage lugs $c^2$, depending from the table, and $b^2$, rising from the bed. The four knife-edges $p^2$ $p^3$ and the four knife-edges $q^3$ $q^4$ are arranged in pairs upon opposite sides of a line drawn through the longitudinal center of the machine, and, moreover, the knife-edges $p^2$ and $q^3$ are arranged in planes coincident with the axes of the screws $i$ $i$. By this arrangement of parts the strain or pressure is equalized on the levers, and the sensitiveness and accuracy of the machine are greatly enhanced. Moreover, there is a more equable distribution of the pressure; and, still further, by the arrangement of the levers $p$ and $q$ one within the other, a decided economy of space is gained, and the machine is thus rendered more compact.

It will be observed with respect to the levers shown in Figs. 1, 2, and 3 that their knife-edges, including the fulcral points of the levers, are all in a common horizontal plane. Levers of substantially the same length, arranged one within the other, may have a somewhat different distribution of their knife-edges, as illustrated in Figs. 4 and 5, and yet retain the economical advantages of my invention. As will be observed, these knife-edges are distributed in pairs on opposite sides of a central horizontal plane relatively to the machine, and said knife-edges also may have the same distribution with respect to the axial centers of the screws; but they may be distributed in two horizontal planes, and in such case the height of the lugs will be modified accordingly.

The air-check consists of a rod $r$ secured to the bed $b$, and rising freely through an opening $s$ in the table. This rod terminates at its upper end in a piston-head $r'$, whose top surface is preferably flush with the end of the rod. Upon this piston-head is placed a cup or cylinder $t$, fitted accurately to the piston-head and resting loosely upon the table. One such air-check is arranged at each corner of the table. When the table starts to recoil, it produces a vacuum between the top of the piston and the top of the cylinder. Consequently any upward movement of the table is at once resisted by the external atmospheric pressure on the equivalent area of each piston and on top of the cylinder.

It may be well to provide means for permitting the escape of the air from the cylinder in setting or adjusting the machine, and for this purpose said cylinder may be provided with any suitable valve. Such a one may be simply a tapering screw $t'$. (Shown in Fig. 7.)

What I claim is—

1. In a testing-machine, the combination, with the screws, the table, lugs on said table, and the bed or frame and lugs thereon, of two levers of equal or substantially equal length arranged one within the other, and having pairs of knife-edges co-operating with lugs on the table and on the bed and arranged on opposite sides of a central longitudinal line relatively to the machine and in planes coincident with the axes of the said screws, substantially as described.

2. In a testing-machine, the combination, with the screws, the table, and the bed or frame, and lugs on said table and bed, of two levers of equal or substantially equal length arranged one within the other, and having pairs of knife-edges arranged in a plane common to all and on opposite sides of a central longitudinal line relatively to the machine and in planes coincident with the axes of the said screws and co-operating with the lugs on the table and on the bed, substantially as described.

3. In a testing-machine, the bed and a movable table, combined with interposed levers of substantially equal length for supporting the said table, one of said levers being fulcrumed within the other and projecting beyond it, substantially as described.

4. In a testing-machine, the bed or frame, screws mounted therein, and a movable table, combined with levers interposed between the bed and the table, and having pivot-edges disposed on opposite sides of a line drawn through the longitudinal center of the machine, and having those pivot-edges which co-operate directly with the table arranged in planes coincident with the axes of the said screws, substantially as described.

5. In a testing-machine, a bed or frame and a movable table, combined with pistons rigidly secured to the bed and rising above the table, and cylinders fitted air-tight to said pistons and loosely placed upon the table, whereby the table is cushioned against recoil under sudden rupture of the specimen, substantially as described.

6. In a testing-machine, a bed or frame and a movable table, combined with pistons rigidly secured to the bed and rising above the table, and cylinders fitted air-tight to said pistons and loosely placed upon the table and provided with escape-valves, substantially as described.

In testimony whereof I have hereunto set hand this 6th day of March, A. D. 1889.

CHARLES ERNEST BUZBY.

Witnesses:
JOHN R. LONGSHAW,
HENRY H. SOWERBY.